May 14, 1963 G. STRULL 3,089,967

PULSE GENERATOR

Filed March 30, 1961

WITNESSES

INVENTOR

Gene Strull

BY

ATTORNEY.

United States Patent Office 3,089,967
Patented May 14, 1963

3,089,967
PULSE GENERATOR

Gene Strull, Pikesville, Md., assignor to Westinghouse Electric Corporation, East Pittsburgh, Pa., a corporation of Pennsylvania Filed Mar. 30, 1961, Ser. No. 99,555
2 Claims. (Cl. 307—88.5)

This invention relates to a pulse generator for producing high speed pulses and more specifically to a semiconductor high speed pulse generator.

It is an object of the invention to provide a circuit for producing high speed pulses.

It is another object of the invention to provide a generator for producing high speed pulses employing semiconductor devices only.

Another object of the invention is the provision of a pulse generator utilizing only semiconductor devices for producing a plurality of high speed pulses.

Other objects and advantages of the present invention will become more apparent to those skilled in the art from the following detailed description when taken in conjunction with the accompanying drawing, wherein.

The invention comprises generally a series circuit which includes a constant voltage source, a hyperconductive negative resistance device, and a negative conductance semiconductor device, and a load impedance. The hyperconuductive negative resistance device has a breakover voltage after which the device is rendered hyperconductive. The current controlled negative conductance element has a breakover current after which the device exhibits a negative conductance characteristic. When the constant voltage source is first applied to the series circuit there is no current flowing through the load since the hyperconductive negative resistance device has not reached its breakover point and represents a very high impedance in the series circuit so that only a small amount of current flows in the circuit. After the negative resistance device breaks over to go into its hyperconductive region the current in the series circuit is greatly increased so that the load begins to see an output current and the high current results in the negative conductance semiconductor in reaching its breakover point. Once the negative conductance device has sufficient current flowing therethrough to breakover, it exhibits a negative conductance or high impedance characteristic to again insert into this series circuit a high impedance and thereby limit the current passing through this series circuit so as to thereby define the trailing edge of the pulse provided across the load impedance.

Figure 1:
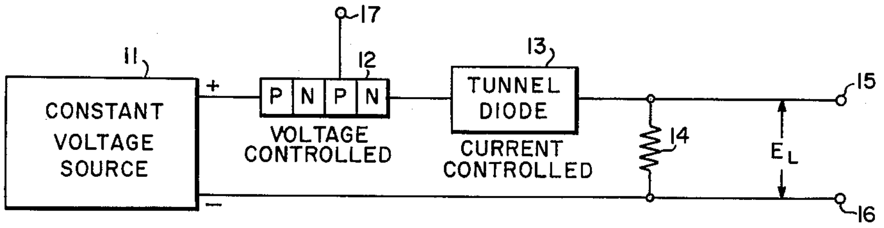
FIGURE 1 illustrates a schematic diagram of an embodiment of the invention.
Figure 2:
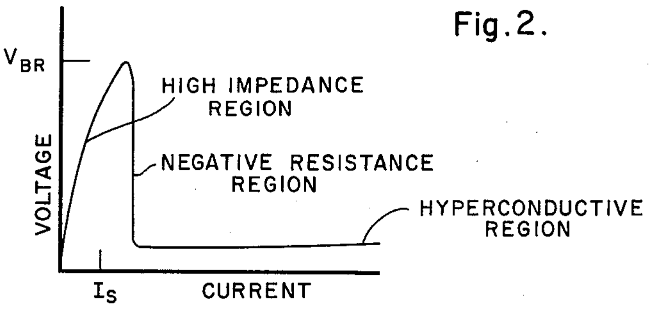
FIG. 2 illustrates a characteristic curve useful in explaining the invention.

The embodiment of the invention illustrated in FIG. 1 more specifically, includes a source of constant voltage 11 or a constant voltage source 11, having the polarities as indicated in the drawing. The constant voltage source 11 is connected in series with a four layer semiconductor switch 12 having a characteristic curve of voltage versus current as shown in FIG. 2. This device is of the p-n-p-n type or of the n-p-n-p type. As is well known, these devices are characterized by having a breakover voltage which when applied across the device will render the device hyperconductive after the device passes through a negative resistance region or has displayed a negative resistance characteristic. This breakover voltage is illustrated in FIG. 2 as $V_{BR}$. After the device has been rendered hyperconductive, it will return to its high impedance state with low current, that is, it will no longer be in the hyperconductive state, if the current through the device is lowered below a certain value which is generally known as the sustaining current, and is illustrated in FIG. 2 as $I_S$.

Figure 3:
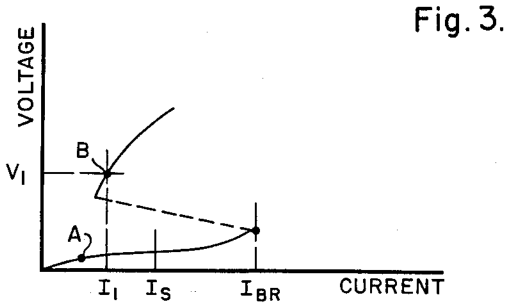
FIG. 3 illustrates another characteristic curve of one of the semiconductors employed in the embodiment of FIG. 1; which is useful in explaining the invention.

The tunnel diode 13 shown in FIG. 1, is a semiconductor structure. It may be made of Ge, Si or any of a number of compound semiconductors from periods III and V of the periodic table (such as GeAs, etc.). This diode exhibits a voltage versus current characteristic curve as shown in FIG. 3. The tunnel diode 13 has an initial low impedance, low voltage area as shown in FIG. 3, and the device is responsive to a predetermined breakover current $I_{BR}$ as shown in FIG. 3. After this predetermined current $I_{BR}$ is reached through the diode 13, the device passes through a negative conductance region, as shown in FIG. 3, and passes through a higher impedance low current region such as illustrated by coordinates $V_1$ and $I_1$ in FIG. 3. In the embodiment in FIG. 1 a constant voltage source is applied to the diode and this voltage can be represented as $V_1$ as shown in FIG. 3. During this state the current through the tunnel diode is small and the impedance of the combination is large in the circuit. As can be seen from FIG. 3, during this period the current through the tunnel diode is less than the current of the negative resistance hyperconductive diode 12. Hence, as will be understood later, the tunnel diode, after it is broken down by exceeding the $I_{BR}$ or breakdown current, will result in turning off the diode 12 or to bring it back to the high impedance low current area as shown in FIG. 2.

In the operation of the pulse generator illustrated in FIG. 1, the constant voltage source 11 with the polarities indicated in FIG. 1, are applied to the circuit. As stated above, the voltage from the constant voltage source 11 is greater than the $V_{BR}$ or the breakover voltage of the diode 12. Before the breakover voltage is actually applied across the diode 12, and the diode is responsive to breakdown or breakover, the hyperconductive negative resistance diode 12 acts as such a high impedance that the series circuit of the diode 12, diode 13 and load resistor 14 has practically no current flowing therethrough and hence no current is applied to the output terminals 15 and 16 or across the load 14. During this period, the tunnel diode 15 remains at a low impedance, low current state illustrated by the region in FIG. 3.

When the diode 12 finally breaks over, in response to the constant voltage source 11, it will pass through the negative resistance region shown in FIG. 2 into the hyperconductive low resistance region shown in FIG. 2. At this time while the diode 12 is in this region, there will be very low impedance in the circuit and have a very small voltage drop in the order of one or two volts. As a result of the diode 12 being rendered hyperconductive, the current in the series circuit will increase and pass through the tunnel diode 13 while the tunnel diode is in its low impedance, low voltage condition or region. When the current through the tunnel diode exceeds the breakover current $I_{BR}$ shown in FIG. 3, it will then pass through the negative conductance region and up to a point B shown in FIG. 3 which is representative of a higher impedance state for the tunnel diode 13. It will be noted that this point B has a voltage $V_1$ and $I_1$ and hence when the point B is reached, which is a higher impedance, lower current state, the current in the circuit will be reduced below the sustatining current of the semiconductor 12 ($I_S$). When the hyperconductive negative resistance diode 12 is shut off, it will return to the high impedance region, so as to result in a negligible current through the series circuit and turn off the tunnel diode 13 thereby returning the current sensitive negative conductance diode 13 from point B to its initial position in point A. Since the diode 12 is returned to its high impedance area and the tunnel diode 13 is returned to its low impedance, low current area, the device will then repeat the cycle of operation described above and a plurality of very short time duration pulses will have then produced continuously.

For a D.C. voltage the embodiment in FIG. 1 will generate one pulse. If an A.C. signal is applied between gate terminal 17 and the adjacent N region a train of pulses can be produced.

Although the invention has been described in connection with a specific embodiment, it will be apparent to those skilled in the art that there are changes in form and arrangement in parts which can be made to suit the requirement without departing from the spirit and scope of the invention.

I claim as my invention:

1. A high speed semiconductor switch comprising: a tunnel diode, a four layer semiconductor hyperconductive negative resistance switch connected in series with said tunnel diode, a load resistance and a constant voltage source, said hyperconductive switch having a breakover voltage substantially less than the voltage of said constant voltage source, and said load resistance being of such a value relative to said constant voltage source so that said tunnel diode obtains a high impedance state after berakover of said seminconductor switch wherein the current therethrough is less than the sustaining current of said semiconductor switch.

2. A high speed semiconductor switch comprising a series circuit including a constant voltage source, a hyperconductive negative resistance semiconductor switch, a current controlled negative conductance device and a load resistance, the breakover voltage of said hyperconductive negative resistance switch being less than the voltage of said constant voltage source, and the impedance of said load resistance being of a value relative to said current controlled negative conductance device, said constant voltage source and said hyperconductive negative resistance device so that said current control negative device reaches a state wherein the impedance thereof is such that the series current is less than the sustaining current of said negative resistance hyperconductive device.

References Cited in the file of this patent

Electrical Manufacturing, "P-N-P-N Four-Layer Diodes In Switching Functions," A. W. Carlson and R. H. McMahon, January 1960 issue, vol. 65, pages 71–78.